United States Patent [19]
Wilson

[11] 3,916,757
[45] Nov. 4, 1975

[54] FASTENERS
[75] Inventor: Robert Neil Wilson, Surrey Hills, Australia
[73] Assignee: Illinois Tool Works Inc., Chicago, Ill.
[22] Filed: Oct. 23, 1974
[21] Appl. No.: 517,348

[30] Foreign Application Priority Data
Oct. 30, 1973 Australia.............................. 5458/73

[52] U.S. Cl..................................... 85/43; 408/224
[51] Int. Cl.² .......................................... F16B 25/00
[58] Field of Search............ 85/43, 41, 47; 408/224, 408/226

[56] References Cited
UNITED STATES PATENTS
3,358,548   12/1967   Dyslin...................................... 85/47
3,699,841   10/1972   Lanius..................................... 85/41

FOREIGN PATENTS OR APPLICATIONS
113,183    2/1918    United Kingdom...................... 85/43
152,885   10/1920    United Kingdom...................... 85/43
173,140    2/1935    Switzerland............................. 85/43

Primary Examiner—Ramon S. Britts
Attorney, Agent, or Firm—Robert W. Beart; Thomas W. Buckman

[57] ABSTRACT

A fastener, preferably a screw fastener, having a shank, a head at one end of said shank, an entry portion at the end of said shank opposite said head and being capable of forming a hole in a workpiece, and at least one cutter means on said shank between said head and said entry portion; said at least one cutter means being capable of forming a countersunk recess about said hole.

6 Claims, 6 Drawing Figures

FASTENERS

This invention relates to fasteners and it refers particularly, though not exclusively, to a screw fastener having means for countersinking or counterboring a screw hole whereby, when the fastener is engaged in a member, the head of the fastener will not project beyond the outer surface of the member.

When fastening facing panels in position on a frame or other base it is presently the practice to first drill through the facing panel, countersink the hole and then to engage a fastener (usually a screw) so as to fasten the facing panel in position.

It is the principal object of the present invention to provide a fastener having means for forming a head-receiving recess at or about the outer end part of a screw hole in a member such as a facing panel.

A further object is to provide an improved screw having means for countersinking or counterboring the hole in which the screw is being engaged, and which will be particularly suitable for use with compressed asbestos sheet and other relatively hand materials.

Another object is to provide a screw having means for countersinking or counterboring its screw hole, such that the pressure applied to the countersinking or counterboring means may be regulated by the operator fitting the screw in position.

With the above and other objects in mind, the present invention provides a fastener having a shank, a head at one end of said shank, an entry portion at the end of said shank opposite said head and being capable of forming a hole in a workpiece, and at least one cutter means on said shank between said head and said entry position; said at least one cutter means being capable of forming a countersunk recess about said hole.

The reference above, and throughout the remainder of this specification, to countersinking is to be taken as including counterboring.

Preferably, the or each of said cutter means comprises a wing member projecting from said shank. Advantageously, said wing member has a leading edge or surface angled to said shank at substantially the same angle as the underside of said head and is of a diameter the same as or greater than the diameter of said head.

In order that the invention may be clearly understood and readily put into practical effect there shall now be described, with reference to the accompanying illustrative drawings, two embodiments of a fastener according to the present invention. In the drawings.

Figure 1:
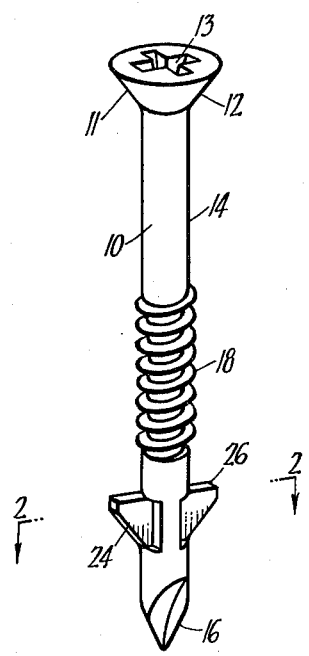
FIG. 1 is a perspective view of a first embodiment.
Figure 2:
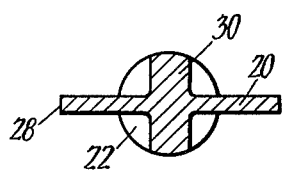
FIG. 2 is a cross-section along the lines and in the direction of arrows 2—2 of FIG. 1.

Referring to FIGS. 1 and 2, there is generally provided a fastener 10 having a countersunk head 11 which includes a tapered underneath surface 12 and slot or slots 13 for engagement by a driving tool of any suitable nature. The fastener 10 is also provided with a shank 14 extending from the head to an entry portion 16. Between the head 11 and the entry portion 16, the shank is provided with a screw-threaded portion 18, the front end of which is separated from the entry portion 16 by a pair of diametrally opposed, radial cutting wings 20. The threaded portion 18 may extend to the head 11 if desired and may be of any suitable type.

The entry portion 16 is of the self-drilling point configuration — which may be of the type known under the Registered Trade Mark "TEKS," or a Type S screw or a Spade drill style of screw — and may be made by forging, milling or grinding with the wings 20 being made by forging or pressing. If the point 16 if formed by forging the wings 20 may be produced in the same operation.

As the wings 20 are pressed out of the shank 14, there is a recess 22 between each wing and the remaining portion 30 of the shank. Each wing 20 has a leading edge 24 at an angle to the shank corresponding to the angle of surface 12 to shank 14, a trailing edge 26 which may be perpendicular to the longitudinal axis of the fastener, and an outer edge 28 parallel to that axis. The diametral dimension of wings 20 should be slightly greater than the diameter of the head 11.

Figure 3:
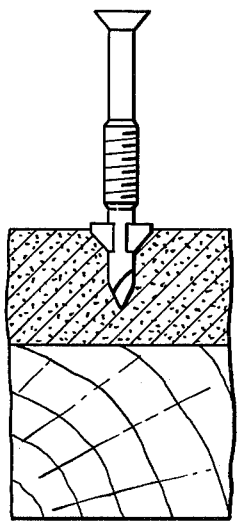
FIGS. 3 to 5 are schematic views illustrating the engagement of this first embodiment in workpieces.
Figure 4:
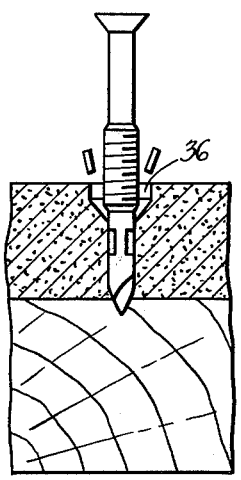
Figure 5:
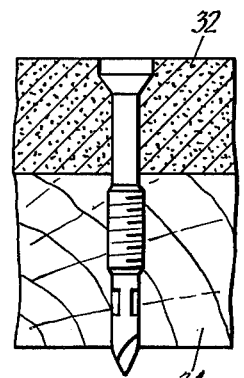

Referring now to FIGS. 3 to 5, there is schematically illustrated the progressive steps in the use of a fastener which, in this case, is securing a sheet of compressed asbestos 32 to a timber frame 34. FIG. 3 shows the position of the fastener just prior to the completion of the countersinking steps. At this stage the drill point 16 had entered the material and the wings 20 had cut-out the countersunk portion. It is to be realized that the thickness of the wings 20 should be such that they will form the hole before they wear away (compressed asbestos is a very abrasive material) or break off when an additional cutting pressure is applied to the screw.

In FIG. 4, the countersinking process has been completed and the screw-thread is entering the countersunk region 36. If there is any of the wings 20 remaining at this stage — for a non-abrasive material all of the wings 20 should be remaining — then the application of a greater pressure to the screw will cause the wings 20 to break away and be removed. This leaves the screw free to complete the operation, as is illustrated in FIG. 5.

To illustrate the dimensions, a 10–16 thread screw may have wings approximately one sixty-fourth inch in thickness and three-eighths inch in overall diameter, with the leading edges at an angle of 80° relative to each other, the underside of the head having an angle of 80° to 82°. The overall length of the wings may be approximately five thirty-seconds inch, and the distance from the point of the screw about eleven thirty-seconds inch. The screw could be made of case hardened steel, cadmium plated. When the wings merge into the screw shank there may be sharp angles, or a radius of suitable dimension.

Figure 6:
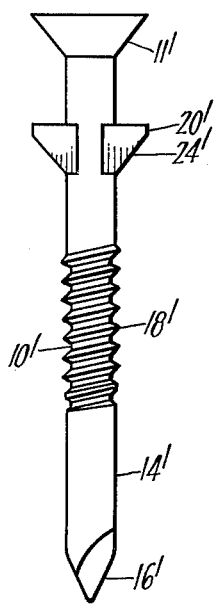
FIG. 6 is a side view of a second embodiment.

In the embodiment of FIG. 6, the wings 20' are placed between the screw threaded portion 18' and the head 11'. The threaded portion 18' may extend from the wings 20' along the shank 14' to the entry portion 16'. In this configuration the pitch of the screw-thread would have to be selected so that the screw 10' advances through the material at such a rate that the wings 20' can perform their function properly. For example, if the screw 10' advances at an excessive speed, the wings 20' would advance into the material at a rate that would not allow for correct swarf removal hence overheating the cutting edges 24' and destroying the wings 20' and/or causing the screw-threaded portion 18' to bore out a hole in the material.

It is to be understood that many modifications in details of design or construction may be made without departing from the scope of the invention, the nature of which is to be determined from the following claims.

What is claimed is:

1. A fastener having a shank, a head at one end of said shank and an entry portion at the other end of said shank, a threaded portion intermediate the entry portion and the head, the undersurface of the head being generally frustoconical tapering upwardly and outwardly from the shank at a predetermined angle to the longitudinal axis of the fastener, at least one wing-like cutting member frangibly connected to the shank including a leading edge and trailing edge, the leading edge being disposed at an angle to the longitudinal axis substantially equal to the predetermined angle of the head undersurface, the radial extent of the leading edge of the cutting member being substantially equal to the radial extent of the tapered undersurface of the head, wherein the cutting member is capable of forming a countersunk recess in a workpiece complementary to the head configuration.

2. A fastener in accordance with claim 1, wherein two diametrically opposed, substantially identical cutting members are formed on the shank.

3. A fastener in accordance with claim 1, wherein the trailing edge of the cutting member extends substantially at right angles to the longitudinal axis of the fastener and the cutting member further includes an outer edge interconnecting the radial outermost extremity of the trailing and leading edges and extends generally parallel to the longitudinal axis.

4. A fastener in accordance with claim 1, wherein the entry portion includes a self-drilling point.

5. A fastener in accordance with claim 1, wherein the cutting member is located intermediate the entry portion and the threaded portion.

6. A fastener in accordance with claim 1, wherein the cutting member is located intermediate the threaded portion and the head.

* * * * *